United States Patent
Beach et al.

(10) Patent No.: US 10,344,619 B2
(45) Date of Patent: Jul. 9, 2019

(54) COOLING SYSTEM FOR A GASPATH COMPONENT OF A GAS POWERED TURBINE

(71) Applicant: United Technologies Corporation, Farmington, CT (US)

(72) Inventors: Eric Beach, Coventry, CT (US); Jeffery A. Lovett, Tolland, CT (US); Javier Nebero Johnson, East Hartford, CT (US); Jorge I. Farah, Hartford, CT (US); Caleb N. Cross, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 414 days.

(21) Appl. No.: 15/205,378

(22) Filed: Jul. 8, 2016

(65) Prior Publication Data

US 2018/0010483 A1 Jan. 11, 2018

(51) Int. Cl.
| | | |
|---|---|---|
| *F01D 5/18* | (2006.01) | |
| *F01D 25/12* | (2006.01) | |
| *F01D 9/02* | (2006.01) | |

(52) U.S. Cl.
CPC ............. *F01D 25/12* (2013.01); *F01D 5/188* (2013.01); *F01D 9/02* (2013.01); *F05D 2220/32* (2013.01); *Y02T 50/676* (2013.01)

(58) Field of Classification Search
CPC ....... F01D 5/187; F01D 9/02; F05D 2260/202
See application file for complete search history.

(56) References Cited

U.S. PATENT DOCUMENTS

| | | | | |
|---|---|---|---|---|
| 2,956,773 | A * | 10/1960 | French ...................... | F01D 5/18 416/90 R |
| 3,628,880 | A * | 12/1971 | Smuland ................. | F01D 5/189 415/175 |
| 4,416,585 | A * | 11/1983 | Abdel-Messeh ........ | F01D 5/187 415/115 |
| 5,383,766 | A | 1/1995 | Przirembel et al. | |
| 6,237,344 | B1 | 5/2001 | Lee | |
| 6,506,013 | B1 | 1/2003 | Burdgick et al. | |
| 6,984,102 | B2 | 1/2006 | Bunker et al. | |
| 8,297,927 | B1 * | 10/2012 | Liang ...................... | F01D 5/186 416/97 R |

(Continued)

FOREIGN PATENT DOCUMENTS

| | | |
|---|---|---|
| EP | 1059418 | 12/2000 |
| EP | 1452693 | 9/2004 |

(Continued)

OTHER PUBLICATIONS

European Search Report for Application No. 17179840.8 dated Nov. 8, 2017.

*Primary Examiner* — Ninh H. Nguyen

(74) *Attorney, Agent, or Firm* — Carlson, Gaskey & Olds, P.C.

(57) ABSTRACT

A gaspath component includes a flowpath body. A cooling plenum is disposed within the flowpath body. The cooling plenum includes a first region configured to receive a cooling flow and a second region configured to expel the cooling flow from the flowpath body. A metering obstruction is positioned between the first region and the second region and is configured to meter a flow of coolant through the cooling plenum.

18 Claims, 5 Drawing Sheets

(56) References Cited

U.S. PATENT DOCUMENTS

| | | | |
|---|---|---|---|
| 8,337,158 B1 * | 12/2012 | Liang | F01D 5/20 29/889.1 |
| 8,827,632 B1 * | 9/2014 | Lee | F01D 5/188 415/115 |
| 8,920,110 B2 | 12/2014 | Anguisola McFeat et al. | |
| 2010/0247327 A1 | 9/2010 | Malecki et al. | |
| 2011/0027102 A1 | 2/2011 | Nakamata et al. | |
| 2012/0177478 A1 | 7/2012 | Giri et al. | |
| 2014/0000283 A1 | 1/2014 | Spangler et al. | |

FOREIGN PATENT DOCUMENTS

| | | |
|---|---|---|
| EP | 1944470 | 7/2008 |
| GB | 2106996 | 4/1983 |

* cited by examiner

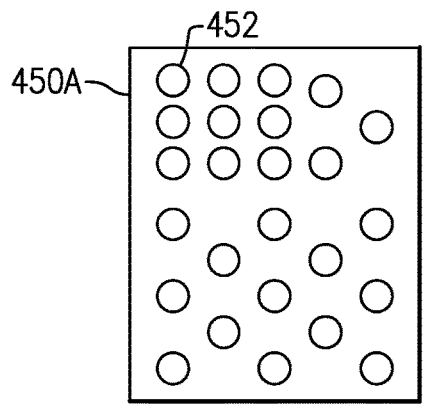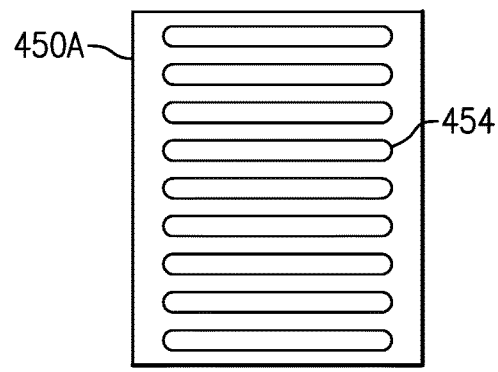
FIG.5A  FIG.5B
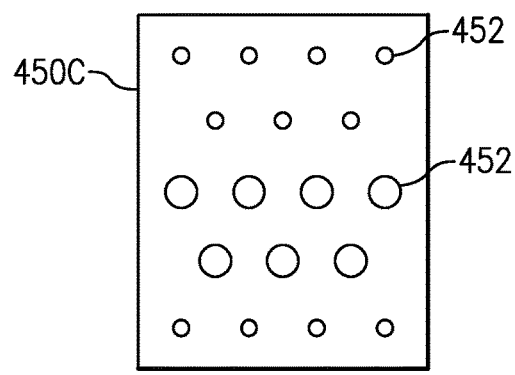
FIG.5C

COOLING SYSTEM FOR A GASPATH COMPONENT OF A GAS POWERED TURBINE

TECHNICAL FIELD

The present disclosure relates generally to gaspath components for gas powered turbines, and more specifically to a cooling system for the same.

BACKGROUND

Gas powered turbines generally include a compressor section that draws in and compresses air, a combustor section where the compressed air is mixed with a fuel and ignited, and a turbine section across which the resultant combustion products are expanded. The expansion of the combustion products drives the turbine to rotate, which in turn drives the compressor.

The combustion of the fuel/air mixture results in extreme temperatures that are carried through to the turbine section. In many cases the extreme temperature of the gasses in the gaspath can exceed the allowable temperature of a gaspath component (components that are exposed to the gas flowing through the gaspath). In such cases, active cooling is implemented within the gaspath component. The active cooling can, in some examples, take the form of passing a cooling fluid, such as cooled air, through passages within the gaspath component and expelling the spent cooling from the gaspath component into the gaspath.

SUMMARY OF THE INVENTION

In one exemplary embodiment a gaspath component includes a flowpath body, a cooling plenum disposed within the flowpath body, the cooling plenum including a first region configured to receive a cooling flow and a second region configured to expel the cooling flow from the flowpath body, and a metering obstruction positioned between the first region and the second region and configured to meter a flow of coolant through the cooling plenum.

In another example of the above described gaspath component the gaspath component is a stator vane, and wherein the flowpath body extends between a first platform and a second platform.

In another example of any of the above described gaspath components the metering obstruction is a wall segment including at least one restricted opening.

In another example of any of the above described gaspath components the at least one restricted opening includes a plurality of metering holes.

In another example of any of the above described gaspath components the plurality of metering holes are evenly distributed across the metering obstruction.

In another example of any of the above described gaspath components the plurality of metering holes are unevenly distributed across the metering obstruction.

In another example of any of the above described gaspath components a density of the metering holes at an end of the metering obstruction farthest from an opening for receiving the cooling flow is greater than a density of the metering holes at an end of the metering obstruction closest to the opening for receiving the cooling flow.

In another example of any of the above described gaspath components the metering obstruction is integral to the flowpath body.

In another example of any of the above described gaspath components the metering obstruction is distinct from the flow path body.

In another example of any of the above described gaspath components the flowpath body is characterized by the presence of a single cooling plenum.

In another example of any of the above described gaspath components the cooling plenum defines a coolant flowpath contacting a corner of the first region opposite an inlet of the first region.

In another example of any of the above described gaspath components the second region includes at least one cooling fluid exit, and wherein the at least one cooling fluid exit includes one of a plurality of effusion holes and a trailing edge opening.

In another example of any of the above described gaspath components the gaspath component is a stator vane disposed within a gas turbine test rig.

In another example of any of the above described gaspath components the metering obstruction is replaceable within the cooling plenum.

Another example of any of the above described gaspath components further includes a plurality of effusion holes connecting the first region to an exterior of the gaspath component and a plurality of effusion holes connecting the second region to the exterior of the gaspath component.

An exemplary method for cooling a gaspath component includes passing a cooling fluid into a first region of cooling fluid plenum, directing the cooling fluid in the first region to at least one hot spot using a metering obstruction, passing the cooling fluid through the metering obstruction into a second region of the cooling fluid plenum, and expelling the cooling fluid from the second region.

In a further example of the above described method for cooling a gaspath component passing the cooling fluid through the metering obstruction comprises passively metering a volume of cooling fluid passing through the metering obstruction.

In a further example of any of the above described methods for cooling a gaspath component passing the cooling fluid through the metering obstruction comprises targeting at least one area of the second region with a greater cooling fluid flow through the metering obstruction in a first area of the metering obstruction than in a second area of the metering obstruction.

In a further example of any of the above described methods for cooling a gaspath component expelling the cooling fluid from the second region to a gaspath comprises at least one of passing the cooling fluid through a plurality of effusion holes, passing the cooling fluid through at least one trailing edge slot, and passing the cooling fluid through a plurality of cooling fluid exit holes.

Another example of any of the above described methods for cooling a gaspath component further includes structurally supporting a flowpath body of the gaspath component using the metering obstruction.

These and other features of the present invention can be best understood from the following specification and drawings, the following of which is a brief description.

BRIEF DESCRIPTION OF THE DRAWINGS

FIGS. 5A, 5B and 5C illustrate exemplary metering obstructions for utilization in the cooling plenum of the gaspath component of FIGS. 2-4.

DETAILED DESCRIPTION OF AN EMBODIMENT

Figure 1:
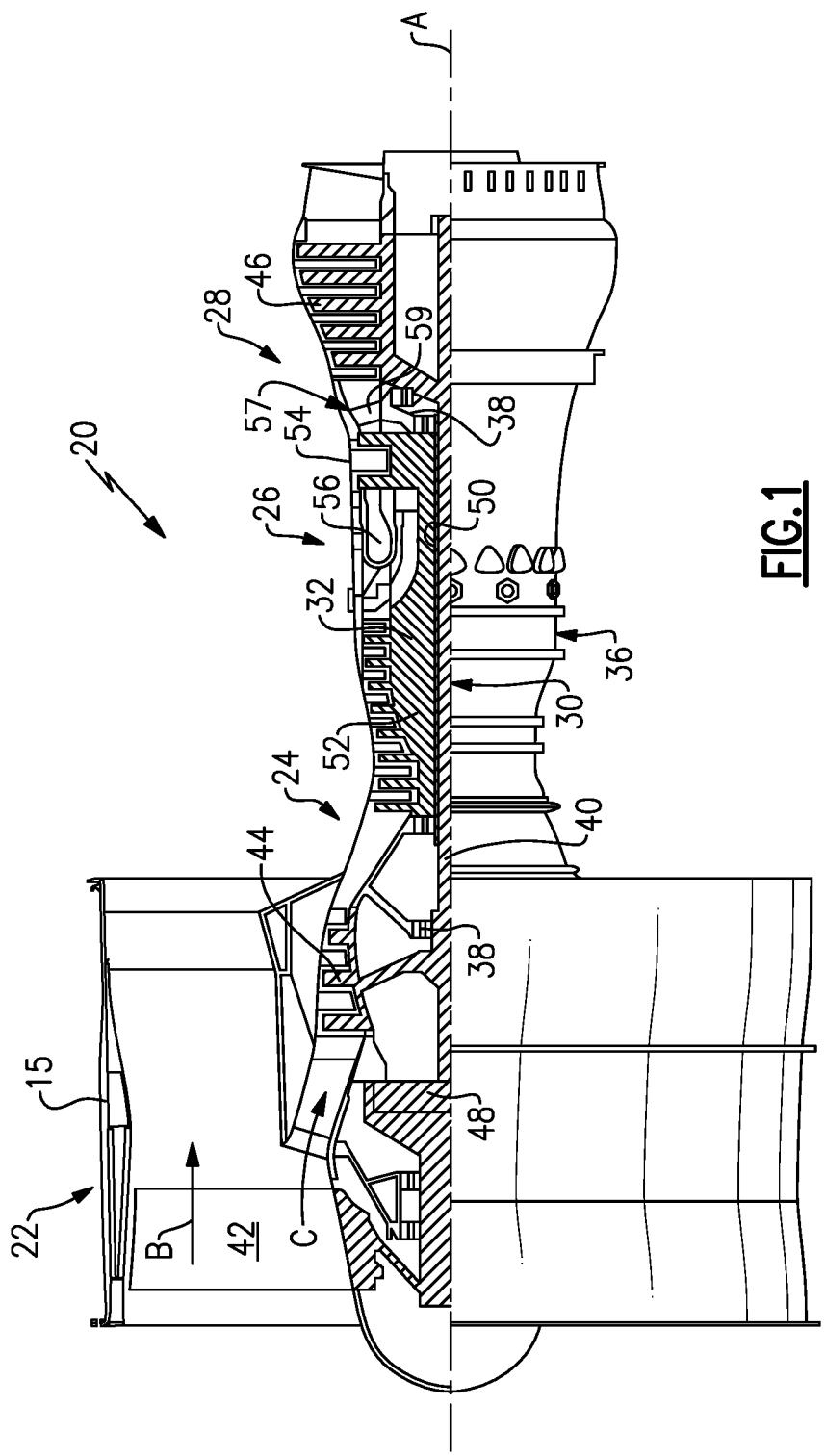
FIG. 1 schematically illustrates an exemplary gas powered turbine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

While described herein in the context of an exemplary gas turbine engine, one of skill in the art, having the benefit of the following disclosure, will understand that the gaspath component, and associated cooling system, described herein can be utilized in any gas powered turbine, including a land based turbine, a marine turbine, a test rig, or any other gas powered turbine construction.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10668 meters). The flight condition of 0.8 Mach and 35,000 ft (10668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]^0.5. The "Low corrected fan tip speed" as disclosed herein according to one non-limiting embodiment is less than about 1150 ft/second (350.5 m/s).

As described above, the combustion of the fuel/air mixture within the combustor 56 generates extremely high temperature combustion products that are expanded across the turbine section 28. In many practical examples, the temperature of the combustion products, and thus the temperatures within the primary flow path of the engine 20, exceed the maximum temperature of gaspath components exposed to the primary flowpath. By way of example, stator vanes downstream of the combustor 56 are frequently exposed to temperatures that exceed the maximum allowable temperature of the material used to construct the vane.

In order to prevent thermal damage to the vanes, and other gaspath components, active cooling is implemented within the gaspath components. The active cooling takes the form of passing a cooling fluid through a plenum within a body portion of the gaspath component, and expelling the spent cooling fluid into the gaspath. In many cases the inlet of a cooling fluid stream is constrained to enter at only one position but is meant to cool the entire component. The variation in pressure and the cooling flow requirement along the component is such that it is difficult to provide the proper cooling fluid for the entire component with only one source. The cooling fluid pressure and flow demand is generally higher at the leading edge of the component due to the impingement of the hot core flow on the component, and the cooling fluid pressure and flow demand for the aft portions of the component is lower.

Figure 2:
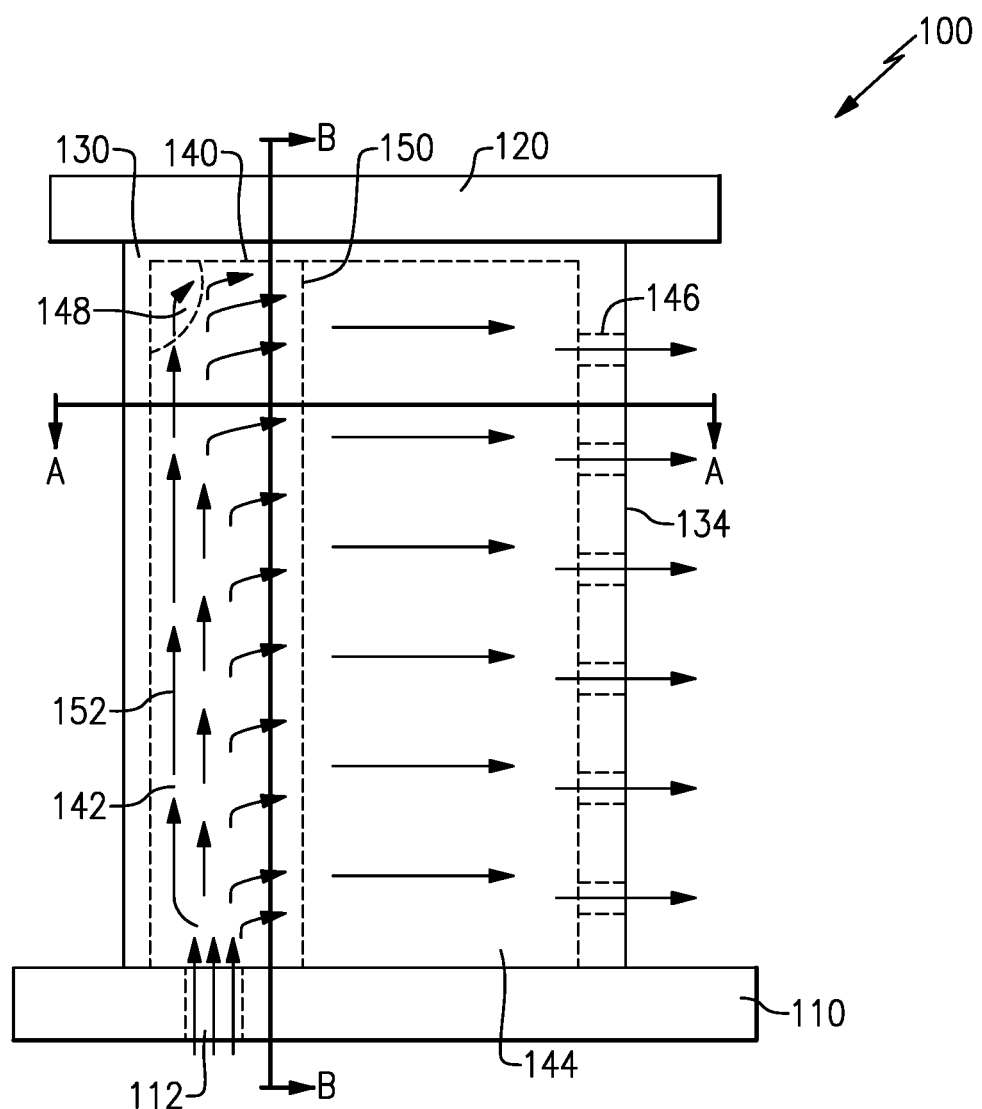
FIG. 2 schematically illustrates a side view of an example gaspath component.

With continued reference to FIG. 1, FIG. 2 schematically illustrates a gaspath component 100 including an active cooling configuration. The exemplary gaspath component 100 is a stator vane, and includes a first, radially inward, platform 110 and a second radially outward platform 120. Supported between the platforms 110, 120 is a flowpath body 130. In an installed configuration, the flowpath body 130 spans the primary flowpath of a gas powered turbine with a leading edge 132 being positioned at an upstream end of the flowpath body 130 and a trailing edge 134 being positioned at a downstream end of the flowpath body 130, relative to an expected direction of fluid flow through the primary flowpath.

Within the flowpath body 130 is a single cooling fluid plenum 140 including a first fluid region 142 and as second fluid region 144. The fluid regions 142, 144 are separated by a metering obstruction 150. The metering obstruction 150 passively controls the flow of fluid from the first region 142 to the second region 144. An opening 112 in the radially inward platform 110 connects the plenum 140 to a single cooling fluid source, and allows cooling fluid to enter the plenum 140. While described in this example as including the opening 112 at the radially inward edge, alternative examples can include the single opening 112 at the outer edge, and operate in a similar manner.

Multiple cooling fluid exits 146 connect a trailing edge of the plenum 140 to the primary flowpath, and allow for the expulsion of spent cooling fluid into the primary flowpath. In alternative examples, a single expulsion slot can replace the illustrated cooling fluid exits 146. In yet further examples, effusion holes can be disposed along one or both sides of the flowpath body 130 at the second region 144, and allow for effusion cooling of the exterior of the flowpath body 130. In alternative examples effusion holes can be included in both the fluid regions 142, 144 and function in the same manner. The effusion holes can be included in addition to, or in place of, the illustrated cooling fluid exits 146. In this method, a single cooling fluid source 112 can provide proper cooling for multiple regions of the component, 140, and 144. In yet further examples, the cooling fluid can be passed through expulsion holes into any other plenum, and the air is not required to be expelled into the primary flowpath.

Due to the presence of the cooling fluid exits 146, or any alternatives, cooling fluid entering the first region 142 is drawn sharply towards the cooling fluid exits 146. This cooling fluid draw results in minimal, if any, cooling fluid contacting a corner 148 of the plenum 140 that is radially opposite the opening 112, relative to a radius of the gas powered turbine. This in turn, results in an area of decreased cooling, alternatively referred to as a hot spot, at the corner 148.

In order to prevent, or minimize, the hot spot, a metering obstruction 150 is positioned within the single plenum 140, and defines a border between the first region 142 and the second region 144. The metering obstruction 150 includes passive metering elements, such as metering holes, that restrict the flow of cooling fluid from the first region 142 to the second region 144. By restricting flow, the metering obstruction 150 ensures that a coolant fluid flow 152 through the plenum 140 extends up into, and contacts, the corner 148. In some examples the density of the metering elements in the metering obstruction 150 increases as it progress away from the opening in the first region 142. The increased density allows a greater magnitude of air, or other cooling fluid, to pass through the metering obstruction at the end farthest away from the opening, thereby forcing a majority of the cooling fluid to the end of the cooling plenum 140 opposite the opening.

In some examples, the metering obstruction 150 is an integral part of the flowpath body 130 and is constructed along with the flowpath body 130. By way of example, a stator vane constructed using an investment casting technique, or an additive manufacturing technique, could construct the metering obstruction 150 simultaneously with constructing the flowpath body 130.

In alternative examples, the metering obstruction 150 is removable and replaceable. In such an example, the metering obstruction 150 is constructed separately and is not integral to the flowpath body 130. Utilization of a removable and replaceable metering obstruction 150 is particularly beneficial when utilized within a test rig. In a test rig, different variations of the removable and replaceable metering obstruction 150 can be tested without requiring the entre stator vane to be removed or replaced with each test.

Figure 3:
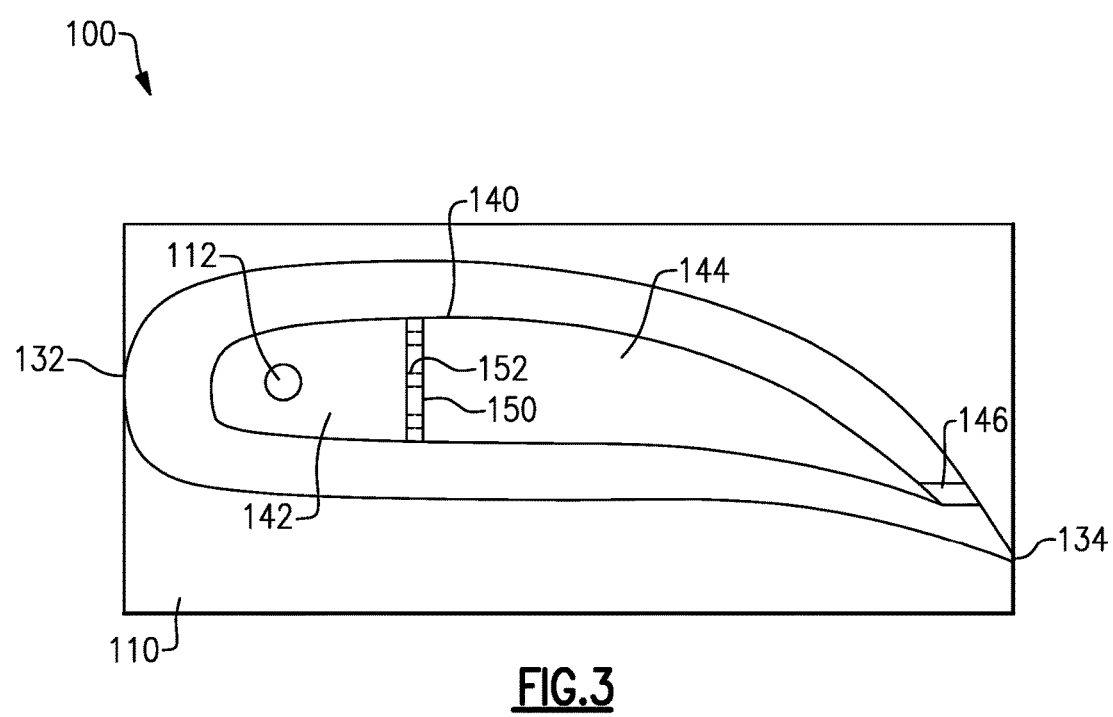
FIG. 3 schematically illustrates a cross sectional view of the example gaspath component of FIG. 2 along view line A-A.

With continued reference to FIG. 2, and with like numerals indicating like elements, FIG. 3 schematically illustrates a cross sectional view of the gaspath component 100 of FIG. 2 along view line A-A. As visible in the cross sectional view of FIG. 3, the flowpath body 130 is, in some examples, an airfoil profile, with the profile of the single cooling plenum being generally the same shape as the flowpath body 130. In alternative examples, the flowpath body 130 can be rectangular, or any other similar shape, depending on the flow correcting needs of the flowpath bodies 130 position within the primary flowpath.

Figure 4:
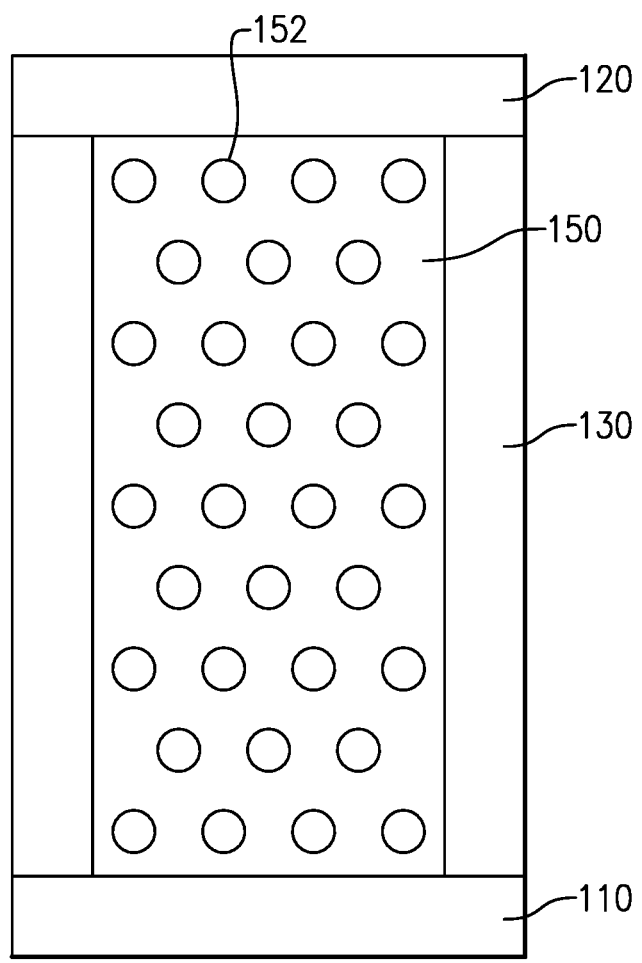
FIG. 4 schematically illustrates a cross sectional view of the example gaspath component of FIG. 2 along vie line B-B.

With continued reference to FIGS. 2 and 3, and with like numerals indicating like elements, FIG. 4 schematically illustrates a cross sectional view along view lines B-B. The cross sectional view along view lines B-B provides a front facing view of the metering obstruction 150. The specific metering obstruction 150, of the examples of FIGS. 2-4 utilizes a plate with a set of metering holes 152 passing through the plate. The metering holes 152 in the illustrated example are evenly distributed across the metering obstruction 150, and allow an equal amount of cooling flow to flow into all areas of the second region 144 of the cooling plenum 140. In alternative examples, the metering holes 152 can be unevenly distributed, to allow for targeted cooling within the second region. In yet further alternative examples, the metering holes 152 can be replaced with slots, or any other shaped opening depending on the metering needs of the gas powered turbine.

With continued reference to FIGS. 2-4, FIGS. 5A, 5B and 5C illustrate alternative example metering obstructions 450A, 450B, 450C that can be utilized within a gaspath component having a single cooling plenum. In the example of FIG. 5A, the metering obstruction 450A includes multiple metering holes 452, with the metering holes 452 being distributed unevenly over the surface of the metering obstruction 450. By including a greater density of metering holes 452 in the upper left region of the metering obstruction 450A, a greater cooling flow through the metering obstruction 450 at the upper left region can be generated. The greater density is achieved by utilizing identically sized metering holes 452, and placing the metering holes 452 closer to each adjacent metering hole 452 in the upper left region.

Alternatively, in the example of FIG. 5B, the metering holes 452 of FIG. 5A are replaced with slots 454. The slots 454 decrease the structural support provided by the metering obstruction 450B, but increase the amount of cooling fluid allowed to pass through the metering obstruction 450.

In the example of FIG. 5C, the metering obstruction 450 includes multiple distinct sizes of metering holes 452, with the center points of the metering holes 452 being evenly distributed across the metering obstruction 450. By varying the size of the metering holes 452, a similar effect to the effect described above with regards to FIG. 5A can be achieved, with a greater volume of cooling fluid being allowed to pass through the metering obstruction 450 in the region where the metering holes are larger.

One of skill in the art, having the benefit of this disclosure will understand that the illustrated metering holes 452, and metering slots 454 are exemplary in nature, and the configurations and shapes can be altered, or combined depending on the needs and configurations of a given embodiment. In one specific example, the disclosed slots of FIG. 5C are combined with the holes 452 of FIG. 5A. As can be appreciated, alternative combinations can also be utilized.

With reference again to FIGS. 2-5C, in each of the examples, the metering obstruction 150, 450 serves, in some examples, as a structural support rib and supports the physical integrity of the flowpath body 130.

Further, while described above within the context of a gas turbine engine, one of skill in the art, having the benefit of this disclosure, will understand that the described gaspath component can be utilized in any gas powered turbine, including test rigs and land based gas powered turbines.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gaspath component comprising:
a flowpath body;
a cooling plenum disposed within said flowpath body, the cooling plenum including a first region configured to receive a cooling flow and a second region configured to expel the cooling flow from the flowpath body and defining a coolant flowpath contacting a corner of said first region opposite an inlet of the first region; and
a metering obstruction positioned between the first region and the second region and configured to meter a flow of coolant through the cooling plenum, and wherein the metering obstruction is configured to direct the flow of coolant to at least one hot spot.

2. The gaspath component of claim 1, wherein the gaspath component is a stator vane, and wherein the flowpath body extends between a first platform and a second platform.

3. The gaspath component of claim 1, wherein the metering obstruction is a wall segment including at least one restricted opening.

4. The gaspath component of claim 3, wherein the at least one restricted opening includes a plurality of metering holes.

5. The gaspath component of claim 4, wherein the plurality of metering holes are evenly distributed across the metering obstruction.

6. The gaspath component of claim 1, wherein the second region includes at least one cooling fluid exit, and wherein the at least one cooling fluid exit includes one of a plurality of effusion holes and a trailing edge opening.

7. The gaspath component of claim 1, wherein the gaspath component is a stator vane disposed within a gas turbine test rig.

8. The gaspath component of claim 1, further comprising a plurality of effusion holes connecting said first region to an exterior of the gaspath component and a plurality of effusion holes connecting said second region to the exterior of the gaspath component.

9. A gaspath component comprising:
a flowpath body;
a cooling plenum disposed within said flowpath body, the cooling plenum including a first region configured to receive a cooling flow and a second region configured to expel the cooling flow from the flowpath body; and
a metering obstruction positioned between the first region and the second region and configured to meter a flow of coolant through the cooling plenum, wherein the metering obstruction is a wall segment including a plurality of metering holes unevenly distributed across the metering obstruction.

10. The gaspath component of claim 9, wherein a density of the metering holes at an end of the metering obstruction farthest from an opening for receiving the cooling flow is greater than a density of the metering holes at an end of the metering obstruction closest to the opening for receiving the cooling flow.

11. The gaspath component of claim 9, wherein the metering obstruction is integral to the flowpath body.

12. The gaspath component of claim 9, wherein the metering obstruction is distinct from the flow path body.

13. The gaspath component of claim 9, wherein the flowpath body is characterized by the presence of a single cooling plenum.

14. A gaspath component comprising:
a flowpath body;
a cooling plenum disposed within said flowpath body, the cooling plenum including a first region configured to receive a cooling flow and a second region configured to expel the cooling flow from the flowpath body;
a metering obstruction positioned between the first region and the second region and configured to meter a flow of coolant through the cooling plenum, and wherein the metering obstruction is configured to direct the flow of coolant to at least one hot spot;
wherein the gaspath component is a stator vane dis;posed within a gas turbine test rig; and
wherein the metering obstruction is replaceable within the cooling plenum.

15. A method for cooling a gaspath component comprising:
passing a cooling fluid into a first region of cooling fluid plenum;
directing the cooling fluid in the first region to at least one hot spot using a metering obstruction;
passing the cooling fluid through the metering obstruction into a second region of the cooling fluid plenum thereby targeting at least one area of the second region with a greater cooling fluid flow through the metering obstruction in a first area of the metering obstruction than in a second area of the metering obstruction; and
expelling the cooling fluid from the second region.

16. The method of claim 15, wherein passing the cooling fluid through the metering obstruction comprises passively metering a volume of cooling fluid passing through the metering obstruction.

17. The method of claim 15, wherein expelling the cooling fluid from the second region to a gaspath comprises at least one of passing the cooling fluid through a plurality of effusion holes, passing the cooling fluid through at least one trailing edge slot, and passing the cooling fluid through a plurality of cooling fluid exit holes.

18. The method of claim 15, further comprising structurally supporting a flowpath body of the gaspath component using the metering obstruction.

* * * * *